United States Patent
Scarcelli et al.

(10) Patent No.: US 10,989,591 B2
(45) Date of Patent: Apr. 27, 2021

(54) METHODS AND ARRANGEMENTS TO ENHANCE OPTICAL SIGNALS WITHIN ABERRATED OR SCATTERING SAMPLES

(71) Applicant: University of Maryland, College Park, College Park, MD (US)

(72) Inventors: Giuliano Scarcelli, Washington, DC (US); Eitan Edrei, Jerusalem (IL)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 16/785,123

(22) Filed: Feb. 7, 2020

(65) Prior Publication Data
US 2020/0256726 A1 Aug. 13, 2020

Related U.S. Application Data

(60) Provisional application No. 62/803,207, filed on Feb. 8, 2019.

(51) Int. Cl.
*G01J 3/44* (2006.01)
*G01J 3/02* (2006.01)
(Continued)

(52) U.S. Cl.
CPC ........... *G01J 3/0208* (2013.01); *G01J 3/4406* (2013.01); *G01J 3/4412* (2013.01);
(Continued)

(58) Field of Classification Search
CPC ...... G01J 3/0208; G01J 3/4412; G01J 3/4406; G01J 3/0218; G01N 21/65; G01N 21/636;
(Continued)

(56) References Cited

U.S. PATENT DOCUMENTS 10,386,288 B2  8/2019  Scarcelli et al.
2009/0046298 A1* 2/2009  Betzig ............... G02B 27/58
                                                356/521
(Continued)

FOREIGN PATENT DOCUMENTS

WO   WO 2018/140602 A1   8/2018
WO   WO 2019/089531 A1   5/2019

OTHER PUBLICATIONS

Antonacci et al., "Biomechanics of subcellular structures by non-invasive Brillouin microscopy," *Scientific Reports*, Nov. 2016, 6: 37217 (7 pages).

(Continued)

*Primary Examiner* — Abdullahi Nur
(74) *Attorney, Agent, or Firm* — Klarquist Sparkman, LLP

(57) ABSTRACT

An optical system has an illumination optical assembly, a detection optical assembly, a wavefront shaping device, and a controller. The illumination optical assembly focuses interrogating optical radiation to a focal point on or in a sample. The interrogating optical radiation propagates to the focal point along a first optical axis. The detection optical assembly direct optical radiation emanating from the focal point to a detector. The emanating optical radiation propagates from the focal point along a second optical axis. The wavefront shaping device is disposed in an optical path of the interrogating optical radiation or in an optical path of the emanating optical radiation. The controller sets a configuration of the wavefront shaping device to correct for aberration. The first optical axis is at a non-zero angle with respect to the second optical axis.

18 Claims, 8 Drawing Sheets

(51) Int. Cl.
G01N 21/65 (2006.01)
G01N 21/63 (2006.01)
G01N 21/64 (2006.01)

(52) U.S. Cl.
CPC ....... *G01N 21/636* (2013.01); *G01N 21/6458* (2013.01); *G01N 21/65* (2013.01); *G01J 3/0218* (2013.01); *G01N 2021/638* (2013.01)

(58) Field of Classification Search
CPC ......... G01N 21/6458; G01N 2021/638; G02B 21/00
See application file for complete search history.

(56) References Cited

U.S. PATENT DOCUMENTS

| | | | | |
|---|---|---|---|---|
| 2016/0305883 | A1* | 10/2016 | Betzig | G02B 21/06 |
| 2016/0334326 | A1* | 11/2016 | Sapiens | G01B 11/24 |
| 2018/0188173 | A1 | 7/2018 | Scarcelli et al. | |
| 2018/0284010 | A1 | 10/2018 | Scarcelli et al. | |
| 2019/0186895 | A1* | 6/2019 | Kalkbrenner | G02B 21/0088 |
| 2019/0391378 | A1* | 12/2019 | Eichelkraut | G02B 26/06 |
| 2020/0182694 | A1 | 6/2020 | Scarcelli et al. | |
| 2020/0278250 | A1 | 9/2020 | Scarcelli et al. | |

OTHER PUBLICATIONS

Antonacci et al., "Elastic suppression in Brillouin imaging by destructive interference," *Applied Physics Letters*, Aug. 2015, 107: 061102 (4 pages).
Antonacci et al., "Quantification of plaque stiffness by Brillouin microscopy in experimental thin cap fibroatheroma," *Journal of the Royal Society Interface*, 2015, 12: 20150843 (4 pages).
Azucena et al., "Adaptive optics wide-field microscopy using direct wavefront sensing," *Optics Letters*, Mar. 2011, 36(6): pp. 825-827.
Ballmann et al., "Impulsive Brillouin microscopy," *Optica*, Jan. 2017, 4(1): pp. 124-128.
Benedek et al., "Brillouin scattering in cubic crystals," *Physical Review*, Sep. 1966, 149(2): pp. 647-662.
Besner et al., "In vivo Brillouin analysis of the aging crystalline lens," *Investigative Ophthalmology & Visual Science*, Oct. 2016, 57(13): pp. 5093-5100.
Booth et al., "Aberration correction for confocal imaging in refractive-index-mismatched media," *Journal of Microscopy*, Nov. 1998, 192(2): pp. 90-98.
Booth et al., "Adaptive aberration correction in a confocal microscope," *Proceedings of the National Academy of Sciences*, Apr. 2002, 99(9): pp. 5788-5792.
Booth, M., "Adaptive optics in microscopy," *Philosophical Transactions of the Royal Society A: Mathematical, Physical and Engineering Sciences*, Sep. 2007, 365(1861): pp. 2829-2843.
Débarre et al., "Image-based adaptive optics for two-photon microscopy," *Optics Letters*, Aug. 2009, 34(16): pp. 2495-2497.
Dil, J., "Brillouin scattering in condensed matter," *Reports on Progress in Physics*, 1982, 45: pp. 285-34.
Edrei et al., "Improving localization precision of Brillouin measurements using spectral autocorrelation analysis," *Journal of Innovative Optical Health Sciences*, Sep. 2017, 10(6): 1742004 (8 pages).
Edrei et al., "Integration of spectral coronagraphy within VIPA-based spectrometers for high extinction Brillouin imaging," *Optics Express*, Mar. 2017, 25(6): pp. 6895-6903.
Elsayad et al., "Mapping the subcellular mechanical properties of live cells in tissues with fluorescence emission-Brillouin imaging," *Science Signaling*, Jul. 2016, 9(435): rs5 (13 pages).
Faris et al., "High-resolution stimulated Brillouin gain spectroscopy in glasses and crystals," *Journal of the Optical Society of America B*, Apr. 1993, 10(4): pp. 587-599.

Fiore et al., "High-extinction virtually imaged phased array-based Brillouin spectroscopy of turbid biological media," *Applied Physics Letters*, May 2016, 108: 203701 (4 pages).
Fleury et al., "Brillouin scattering in simple liquids: argon and neon," *Physical Review*, Oct. 1969, 186(1): pp. 244-254.
Hartschuh et al., "Acoustic modes and elastic properties of polymeric nanostructures," *Applied Physics Letters*, Oct. 2005, 87: 173121 (4 pages).
Hermann et al., "Adaptive-optics ultrahigh-resolution optical coherence tomography," *Optics Letters*, Sep. 2004, 29(18): pp. 2142-2144.
Ji, N., "Adaptive optical fluorescence microscopy," *Nature Methods*, Mar. 2017, 14(4): pp. 374-380.
Ji et al., "Characterization and adaptive optical correction of aberrations during in vivo imaging in the mouse cortex," *Proceedings of the National Academy of Sciences*, Jan. 2012, 109(1): pp. 22-27.
Jorand et al., "Deep and clear optical imaging of thick inhomogeneous samples," *PLoS One*, Apr. 2012, 7(4): e35795 (10 pages).
Koski et al., "Non-invasive determination of the complete elastic moduli of spider silks," *Nature Materials*, Jan. 2013, 12(3): pp. 262-267.
Li et al., "Conjugate adaptive optics in widefield microscopy with an extended-source wavefront sensor," *Optica*, Aug. 2015, 2(8): pp. 682-688.
Marcos et al. "Vision science and adaptive optics: The state of the field," *Vision Research*, Feb. 2017, 132: pp. 3-33.
Mattana et al., "High-contrast Brillouin and Raman microspectroscopy for simultaneous mechanical and chemical investigation of microbial biofilms," *Biophysical Chemistry*, Jun. 2017, 229: pp. 123-129.
Meng et al., "Background clean-up in Brillouin microspectroscopy of scattering medium," *Optics Express*, Feb. 2014, 22(5): pp. 5410-5415.
Meng et al., "Seeing cells in a new light: a renaissance of Brillouin spectroscopy," *Advances in Optics and Photonics*, Jun. 2016, 8(2): pp. 300-327.
Mertz et al., "Field of view advantage of conjugate adaptive optics in microscopy applications," *Applied Optics*, Apr. 2015, 54(11): pp. 3498-3506.
Palombo et al., "Biomechanics of fibrous proteins of the extracellular matrix studied by Brillouin scattering," *Journal of The Royal Society Interface*, 2014, 11: 20140739 (12 pages).
Park et al. "Perspective: Wavefront shaping techniques for controlling multiple light scattering in biological tissues: Toward in vivo applications," *APL Photonics*, Jul. 2018, 3: 100901 (20 pages).
Remer et al., "Background-free Brillouin spectroscopy in scattering media at 780 nm via stimulated Brillouin scattering," *Optics Letters*, 2016, 41(5): pp. 926-929.
Roorda et al., "Adaptive optics scanning laser ophthalmoscopy," *Optics Express*, May 2002, 10(9): pp. 405-412.
Roorda et al., "The arrangement of the three cone classes in the living human eye," *Nature*, Feb. 1999, 397(6719): pp. 520-522.
Scarcelli et al., "Confocal Brillouin microscopy for three-dimensional mechanical imaging," *Nature Photonics*, Dec. 2007, 2: pp. 39-43.
Scarcelli et al., "Cross-axis cascading of spectral dispersion," *Optics Letters*, Nov. 2008, 33(24): pp. 2979-2981.
Scarcelli et al., "In vivo biomechanical mapping of normal and keratoconus corneas," *JAMA Ophthalmology*, Apr. 2015, 133(4): pp. 480-482.
Scarcelli et al., "Multistage VIPA etalons for high-extinction parallel Brillouin spectroscopy," *Optics Express*, May 2011, 19(11): pp. 10913-10922.
Scarcelli et al., "Noncontact three-dimensional mapping of intracellular hydromechanical properties by Brillouin microscopy," *Nature Methods*, Oct. 2015, 12(12): pp. 1132-1134. (5 pages).
Shao et al., "Etalon filters for Brillouin microscopy of highly scattering tissues," *Optics Express*, Sep. 2016, 24(19): pp. 22232-22238.
Sinefeld et al., "Adaptive optics in multiphoton microscopy: comparison of two, three and four photon fluorescence," *Optics Express*, Nov. 2015, 23(24): pp. 31472-31483.

(56) References Cited

OTHER PUBLICATIONS

Tao et al., "Adaptive optics confocal microscopy using direct wavefront sensing," *Optics Letters*, Apr. 2011, 36(7): pp. 1062-1064.

Wang et al., "Direct wavefront sensing for high-resolution in vivo imaging in scattering tissue," *Nature Communications*, Jun. 2015, 6: 7276 (6 pages).

Wang et al., "Multiplexed aberration measurement for deep tissue imaging in vivo," *Nature Methods*, Aug. 2014, 11(10): pp. 1037-1040. (7 pages).

Wang et al., "Rapid adaptive optical recovery of optimal resolution over large volumes," *Nature Methods*, Jun. 2014, 11(6): pp. 625-631.

Wright et al., "Adaptive optics for enhanced signal in CARS microscopy," *Optics Express*, Dec. 2007, 15(26): pp. 18209-18219.

Zawadzki et al., "Adaptive-optics optical coherence tomography for high-resolution and high-speed 3D retinal in vivo imaging," *Optics Express*, Oct. 2005, 13(21): pp. 8532-8546.

Zhang et al., "Brillouin flow cytometry for label-free mechanical phenotyping of the nucleus," *Lab on a Chip*, 2017, 17(4): pp. 663-670.

Zhang et al., "Line-scanning Brillouin microscopy for rapid non-invasive mechanical imaging," *Scientific Reports*, Oct. 2016, 6: 35398 (8 pages).

Zhang et al., "Tissue biomechanics during cranial neural tube closure measured by Brillouin microscopy and optical coherence tomography," *Birth Defects Research*, Sep. 2018, 111: pp. 991-998.

\* cited by examiner

METHODS AND ARRANGEMENTS TO ENHANCE OPTICAL SIGNALS WITHIN ABERRATED OR SCATTERING SAMPLES

CROSS REFERENCE TO RELATED APPLICATION

The present application claims the benefit of U.S. Provisional Application No. 62/803,207, filed Feb. 8, 2019, which is hereby incorporated by reference herein in its entirety.

FIELD

The present disclosure relates generally to optical systems, and more particularly, to methods and arrangements for enhancing optical signals to account for aberrations.

BACKGROUND

Optical imaging systems often suffer from degraded performance due to aberration, for example, due to optical elements, sample inhomogeneity, and refractive index mismatches within the optical path. Adaptive optics has been used to shape the wavefront of the optical radiation (e.g., light interrogating the sample) to help correct for aberrations introduced by optical elements or the sample itself. In many existing applications of adaptive optics, the optical system has access to a guide-star, which is a point-like structure that is smaller than the diffraction limit. The guide-star is used as a beacon for the tuning the adaptive optics to provide the desired correction of the aberration.

However, in some optical systems (e.g., certain microscopy or spectroscopy applications), the properties of the interrogated sample or the optical system may prevent or interfere with the use of a guide-star, thereby degrading the correction offered by adaptive optics. For example, in microscopy applications where the fluorescent labeling is diffused within a sample (e.g., a densely labeled sample that creates a fluorescent "sea"), it may be difficult to ensure the existence of a single fluorescent bead within the illumination path to use as a guide-star. Moreover, in some spectroscopic measurements, a signal may arise from any location within the illumination path. For example, the signal in Brillouin light scattering spectroscopy arises from the full extended region of the illuminated voxel, such that implementation of wavefront correction to a single location within the sample is not straightforward. As a result, performance of such spectroscopy systems is rapidly degraded by optical aberrations, and such spectroscopy systems have been limited to homogenous transparent samples.

Embodiments of the disclosed subject matter may address one or more of the above-noted problems and disadvantages, among other things.

SUMMARY

Embodiments of the disclosed subject matter provide optical systems and methods for correction of aberrations using a wavefront shaping device (e.g., adaptive optics). Embodiments of the disclosed subject matter are particularly applicable to scenarios in which the optical signal received from the sample cannot be approximated as coming from a collection of point-like sources, for example, due to scattering or other factors. Rather, the un-localized optical signal can arise from any location within the sample (e.g., not only from a confined structure), which un-localization would otherwise undermine effective configuration of the wavefront shaping device to correct for aberration. For example, the optical system can have a non-collinear arrangement, where an optical axis for the interrogation optical radiation crosses (i.e., at a non-zero angle with respect to) an optical axis for the emitted optical radiation (e.g., fluorescent, reflected, or scattered light) from the sample, thereby creating a narrowed overlapping region between interrogation and detection paths that can be used as a pseudo guide-star for configuring the wavefront shaping device to correct for aberration.

In one or more embodiments, an optical system comprises an illumination optical assembly, a first detection optical assembly, a wavefront shaping device, and a controller. The illumination optical assembly can be configured to focus interrogating optical radiation to a focal point on or in a sample. The focused interrogating optical radiation propagates to the focal point along a first optical axis. The first detection optical assembly can be configured to direct optical radiation emanating from the focal point to a first detector. The emanating optical radiation propagates from the focal point along a second optical axis. The wavefront shaping device can be disposed in an optical path of the interrogating optical radiation or in an optical path of the emanating optical radiation. The controller can be configured to set a configuration of the wavefront shaping device to correct for aberration. The first optical axis can be at a non-zero angle with respect to the second optical axis.

In one or more embodiments, a method comprises, using an illumination optical assembly, directing interrogating optical radiation along a first optical axis to a first focal point. The method can further comprise, using a first detection optical assembly, directing optical radiation emanating from the first focal point along a second optical axis to a first detector. The method can also comprise, based on one or more signals from the first detector indicative of radiation incident thereon, setting a configuration of a wavefront shaping device to correct for aberration. The wavefront shaping device can be provided in an optical path of the interrogating optical radiation or in an optical path of the emanating optical radiation. The first optical axis can be at a non-zero angle with respect to the second optical axis.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or solid/dashed lines rather than employing ray diagrams. Throughout the figures, like reference numerals denote like elements.

DETAILED DESCRIPTION

Figure 1:
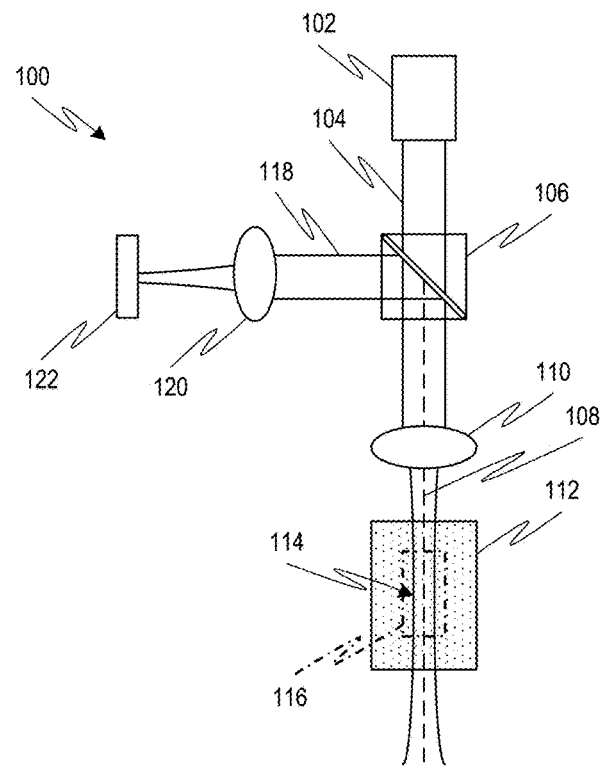
FIG. 1 is a simplified schematic diagram of an optical system employing an epi-detection configuration.

Embodiments of the disclosed subject matter relate to optical systems and methods for correcting aberrations by wavefront shaping (e.g., using adaptive optics) in applications where light is emitted spontaneously from any location within a finite illuminated region rather than as a collection of discrete points that can be separately distinguished by the optical system. Such optical signals are referred to herein as "un-localized." Examples of un-localized signal applications include, but are not limited to, spectroscopic techniques where the generation of scattered light can occur everywhere interrogating light interacts with a sample (e.g., Brillouin light scattering spectroscopy techniques, Raman light scattering spectroscopy techniques, or Rayleigh, Mie, or other elastic light scattering spectroscopy techniques), label-free imaging where the optical signal is generated in non-point-like manner, and fluorescence imaging where the labelling is sufficiently dense that the signal can be considered not localized (e.g., creating a fluorescent "sea"). Un-localized signals impose a significant challenge because determination of the configuration for the wavefront shaping device is compromised by light arriving from various locations within the illuminated regime. The un-localized signal may also introduce a concern with respect to focal point shifting during the optimization process, for example, where the wavefront shaping device shifts the focal illumination to a nearby location from which a better signal is acquired thereby resulting in a false measurement. In contrast, embodiments of the disclosed subject matter provide improved wavefront shaping for aberration correction while maintaining the exact location of the focal point.

In embodiments, configuration of the wavefront shaping device to achieve aberration correction is performed where an overlap between interrogation and detection optical beam paths has been minimized or at least reduced. For example, the optical system can have a non-collinear arrangement, where respective optical axes of the interrogation and detection assemblies of the optical system cross each other (i.e., at a non-zero angle with respect to each other). The narrowed spot resulting from the overlapped optical beam paths can thus act as pseudo guide-star that serves as a beacon for configuring the wavefront shaping device. Configuration of the wavefront shaping device to correct for aberration can thereby be performed without provision of a separate guide-star or beacon.

In some embodiments, the wavefront shaping techniques can employ an indirect correction approach, where an iterative process is used to estimate the aberration or to calculate the aberration from an acquired image. In such embodiments, the same detector of the optical system used for subsequent investigation (e.g., imaging or measurement) of the sample can be used for detecting the optical signal for aberration correction. In other embodiments, the wavefront shaping techniques can employ a direct correction approach, where a wavefront sensor is used to measure the aberration. In such embodiments, the aberration correction by the wavefront sensor may occur at a same time as the investigation of the sample using a separate detector. In some embodiments, however, the direct correction approach may still require provision of a separate guide-star or beacon.

Referring to FIG. 1, an optical system 100 is illustrated to explain certain issues associated with aberration correction for un-localized samples. Optical system 100 is organized in an epi-detection configuration, with interrogating optical radiation 104 from source 102 (e.g., laser) and emitted optical radiation 118 (e.g., fluorescent, scattered, or reflected light) to detector 122 being directed along a common optical axis 108 proximal the sample 112. As such, the interrogating beam path and detected beam path can both pass through a common focusing lens 110 (e.g., objective lens). A beam splitter 106 is disposed along the optical paths to redirect emitted optical radiation 118 from common axis 108 to detector 122 via a focusing lens 120 (e.g., imaging lens). When sample 112 emits optical radiation 118 that is unlocalized, wavefront correction in the epi-detection configuration of FIG. 1 (e.g., by a wavefront shaping device in the optical path between source 102 and sample 112 or in the optical path between detector 122 and sample 112) would be compromised. For example, optical signals can arise from any location within the Rayleigh range 116 of the interrogation optical beam 104 and thus cannot be used as a point-like guide-star. Accordingly, the epi-detection configuration of optical system 100 cannot properly estimate optical aberrations.

Figure 2A:
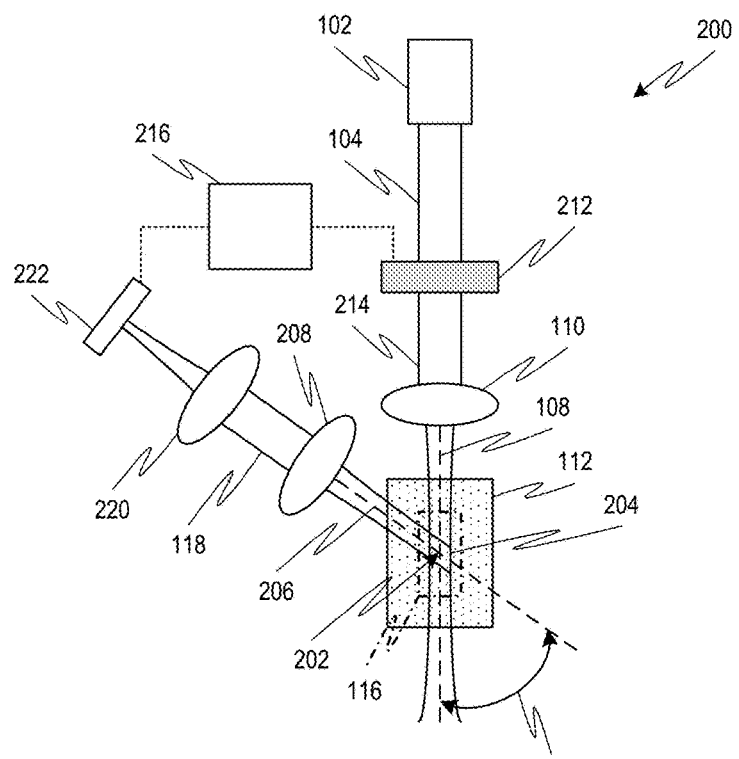
FIG. 2A is a simplified schematic diagram of an exemplary optical system employing a non-collinear arrangement for configuration of a wavefront shaping device, according to one or more embodiments of the disclosed subject matter.

Referring to FIG. 2A, an optical system 200 is illustrated that addresses the above-noted issues with the epi-detection configuration. In particular, the optical system 200 has a non-collinear arrangement where the detection and illumination arms cross (i.e., are at non-zero angles with respect to each other). Thus, interrogating optical radiation 104 from source 102 is directed along first optical axis 108 to a focal point 202 on or in sample 112, while emitted optical radiation 118 is directed from focal point 202 to detector 222 along second optical axis 206. As such, the interrogating beam path can pass through a first focusing lens 110 (e.g., objective lens), and the detected beam path can pass through a second focusing lens 208 (e.g., objective lens). Alternatively, the interrogating beam path and detected beam paths can share a common focusing lens so long as the beam paths remain at non-zero angles with respect to each other.

With the optical axis 206 of the detection arm at an angle 210 with respect to the optical axis 108 of the illumination arm, the effective contribution area is minimized, or at least reduced as compared to the Rayleigh range 116, by the limited overlap 204 of the two optical paths. By reducing the overlapping region of the illumination and detection optical paths, the configuration becomes similar to that using a guide-star but where the beacon size has been reduced optically rather than physically. The amount of overlap 204 can be controlled, for example, by modifying angle 210 between the optical axes 108, 206 (for example, where the angle 210 is measured between a ray extending from focal point 202 toward lens 110 and a ray extending from focal point 202 toward lens 208). For example, the angle 210 can be at least 15°, with larger angles leading to potentially greater signal enhancement.

A wavefront shaping device 212 can be provided for the interrogating optical radiation 104, for example, between the source 102 and focusing lens 110. The wavefront shaping device 212 can modify a wavefront shape of the interrogating optical radiation 104 to produce a corrected beam 214. For example, the wavefront shaping device 212 can be any type of adaptive optics (AO), such as a spatial light modulator (SLM). Exemplary SLMs include, but are not limited to, deformable mirrors (DM), digital micromirror devices (DMDs), or a liquid crystal device, such as liquid crystal on silicon (LCoS) modulators. Other types of electro-optic devices or phase-changing elements to provide the desired wavefront shaping (whether in a transmissive configuration, as shown, or a reflective configuration) are also possible according to one or more contemplated embodiments. The modified wavefront of beam 214 is designed to compensate for aberrations introduced by optical elements, the sample, or other features in the optical path. Alternatively or additionally, a wavefront shaping device can be provided for the emitted optical radiation 118, for example, between the detector 222 and focusing lens 208, and can modify a wavefront shape of the emitted radiation 118.

The system 100 can include a control system 216 and an input/output device (not shown) (e.g., display, keyboard, mouse, etc.). For example, the control system 216 can be operatively coupled to the detector 222 to receive one or signals therefrom indicative of the detected radiation. In investigating sample 112 (e.g., imaging or measuring), the control system 216 can process the signals to yield an image of the sample 112, which image may be displayed to a user via the input/output device. For aberration correction, the control system 216 can set a configuration of the wavefront shaping device 212 based on one or more signals received from detector 222. In particular, radiation 118 emitted from the pseudo guide-star formed by the overlap 204 is detected by detector 222. Based on the detected radiation, the controller 216 modifies a configuration of wavefront shaping device 212 to yield interrogating beam 214 (e.g., phase modulated) corrected for aberrations. Determination of the correction configuration of the wavefront shaping device 212 can be by way a direct correction approach or an indirect correction approach, for example, as discussed in further detail below with respect to FIGS. 3A-3B.

In some embodiments, the sample 112 can be supported a movable positioning stage (not shown). The control system 216 can control the positioning stage to move the sample 112 in one, two, or three dimensions so as to move the focal point 202 between different positions. Alternatively or additionally, the system 200 can have additional optical elements (e.g., movable reflective elements) controlled by the control system 216 and configured to redirect the illuminating and detection optical beams to move the focal point 202 between different positions. For example, the focal point 202 may be at a first position for aberration correction and then moved to a second different position within or on the sample for subsequent investigation. The different position for aberration correction may avoid damage to or alteration of the sample due to prolonged exposure to interrogating radiation as part of the determination of wavefront shaping device 212 configuration.

In some embodiments, the detector 222 and associated optical components in the detection arm (e.g., lenses 208, 220) can be part of a spectrometer configured to measure spectral components emitted from the sample 112. For example, the desired spectral components may be Brillouin scattered light, Raman or Rayleigh-wing scattered or fluorescence light, or any other light signal. When configured as a spectrometer, detector 222 can have an array of pixels for detecting spatially separated radiation delivered thereto. For example, the detector 222 can be a charge-coupled device (CCD) image sensor, a complementary metal-oxide semiconductor (CMOS) image sensor, or any other radiation detecting sensor.

In some embodiments, the detector 222 and associated optical components in the detection arm are configured for direct wavefront sensing. For example, the detector 222 can have a lenslet array that focuses the emitted optical radiation 118 onto a 2-D array of detection elements. The system 200 may also include a reconstructor (not shown) to convert electrical signals from detector 222 into phase aberrations, which can be used by controller 216 to adjust the configuration of wavefront shaping device 212 in real-time.

The configuration of optical system 200 in FIG. 2A may be used primarily for determining the configuration of the wavefront shaping device for aberration correction. However, detection efficiency in such a configuration is limited. Thus, in some embodiments, subsequent investigation of the sample with aberration correction applied can be by way of an epi-detection configuration. For example, when system 200 is provided with a single detection assembly with detector 222, the detection optical path may reconfigure from the non-collinear arrangement (with optical axes 108, 206 crossing) to the epi-detection configuration (with optical axes 108, 206 being coincident, for example, as in FIG. 1).

Figure 2B:
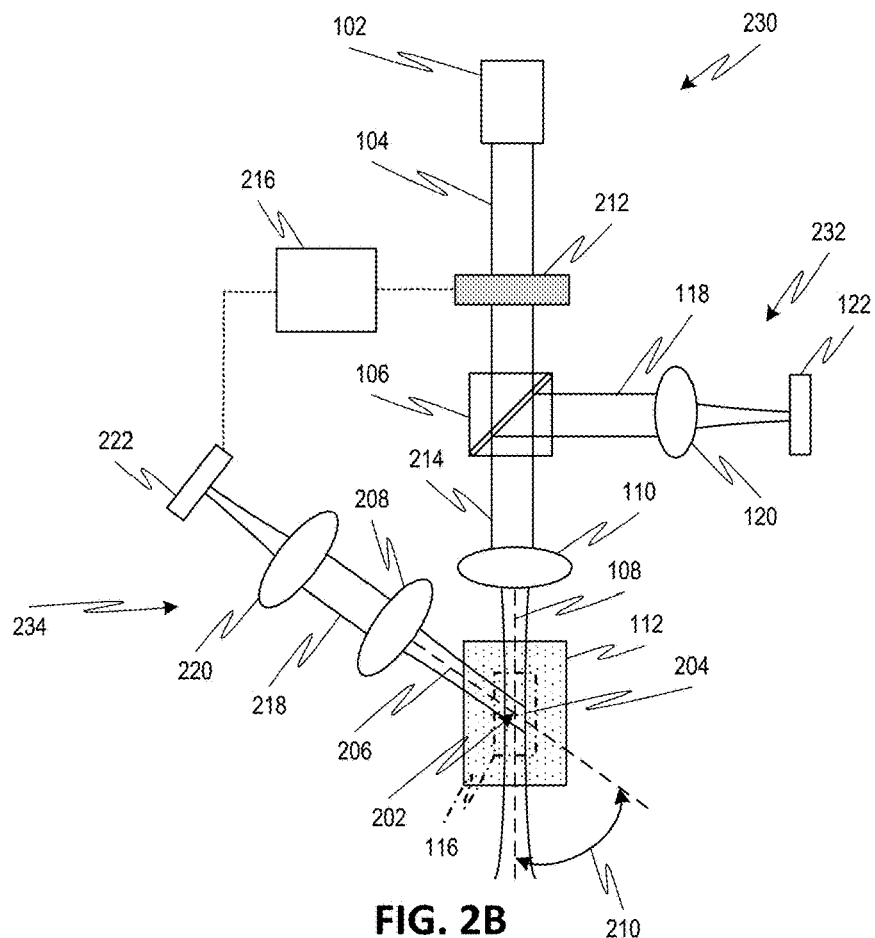
FIG. 2B is a simplified schematic diagram of another exemplary optical system employing a non-collinear arrangement for configuration of a wavefront shaping device and an epi-detection configuration for sample interrogation, according to one or more embodiments of the disclosed subject matter.

Alternatively, the optical system can be provided multiple detectors and corresponding detection assemblies, with one being designated for aberration correction measurements and another being designated for sample investigation. For example, FIG. 2B illustrates an optical system 230 that has a first detection assembly 232 with first detector 122 in an epi-detection configuration (similar to FIG. 1) and a second detection assembly 234 with second detector 222 in a non-collinear detection configuration (similar to FIG. 2A). The control system 216 thus modifies a configuration of wavefront shaping device 212 based on signals from detector 222 indicative of the emitted radiation 218 from overlapping region 204 to compensate for aberrations. The first detector 122 receives emitted radiation 118 from the sample 112 via objective lens 110 and beam splitter 106. Since emitted radiation 118 is a product of the Rayleigh range 116 rather than the smaller overlapping area 204, the detected signal magnitude may be greater than would otherwise be obtained in the non-collinear arrangement. Moreover, the decoupling between the detection for aberration correction (i.e., via non-collinear detection arm 234) and the detection for sample investigation (i.e., via epi-detection arm 122) can allow for simultaneous aberration correction and sample investigation.

Figure 2C:
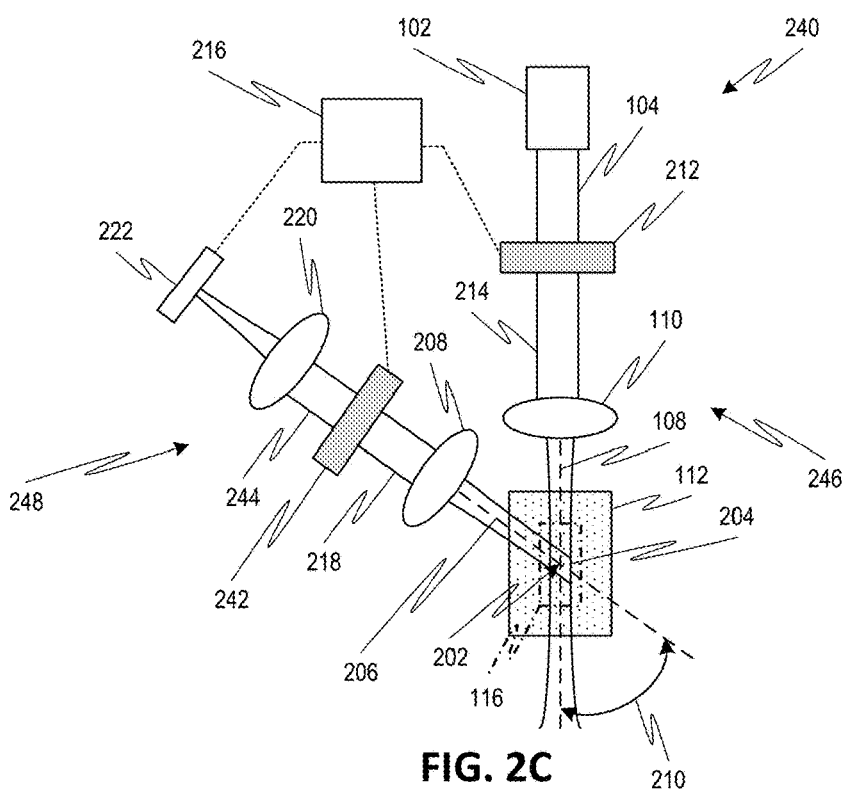
FIG. 2C is a simplified schematic diagram of another exemplary optical system employing a non-collinear arrangement for configuration of multiple wavefront shaping devices, according to one or more embodiments of the disclosed subject matter.

FIGS. 2A-2B illustrate the wavefront shaping device on the interrogating side of the optical system. Alternatively or additionally, a wavefront shaping device can be provided on the detection side of the optical system. For example, FIG. 2C shows an optical system 240 similar to that shown in FIG. 2A but including a second wavefront shaping device 242 in the detection arm 248 in addition to the first wavefront shaping device 212 in the interrogation arm 246. The wavefront shaping devices 212, 242 can be used to alter the wavefronts of beams interacting therewith to produce respective beams 214, 244 corrected for aberrations in their respective optical paths. In such arrangements, care should be taken to perform configuration of each wavefront shaping device 212, 242 to avoid cross-talk as well as spatial shifts of focal point 202.

Figure 3A:
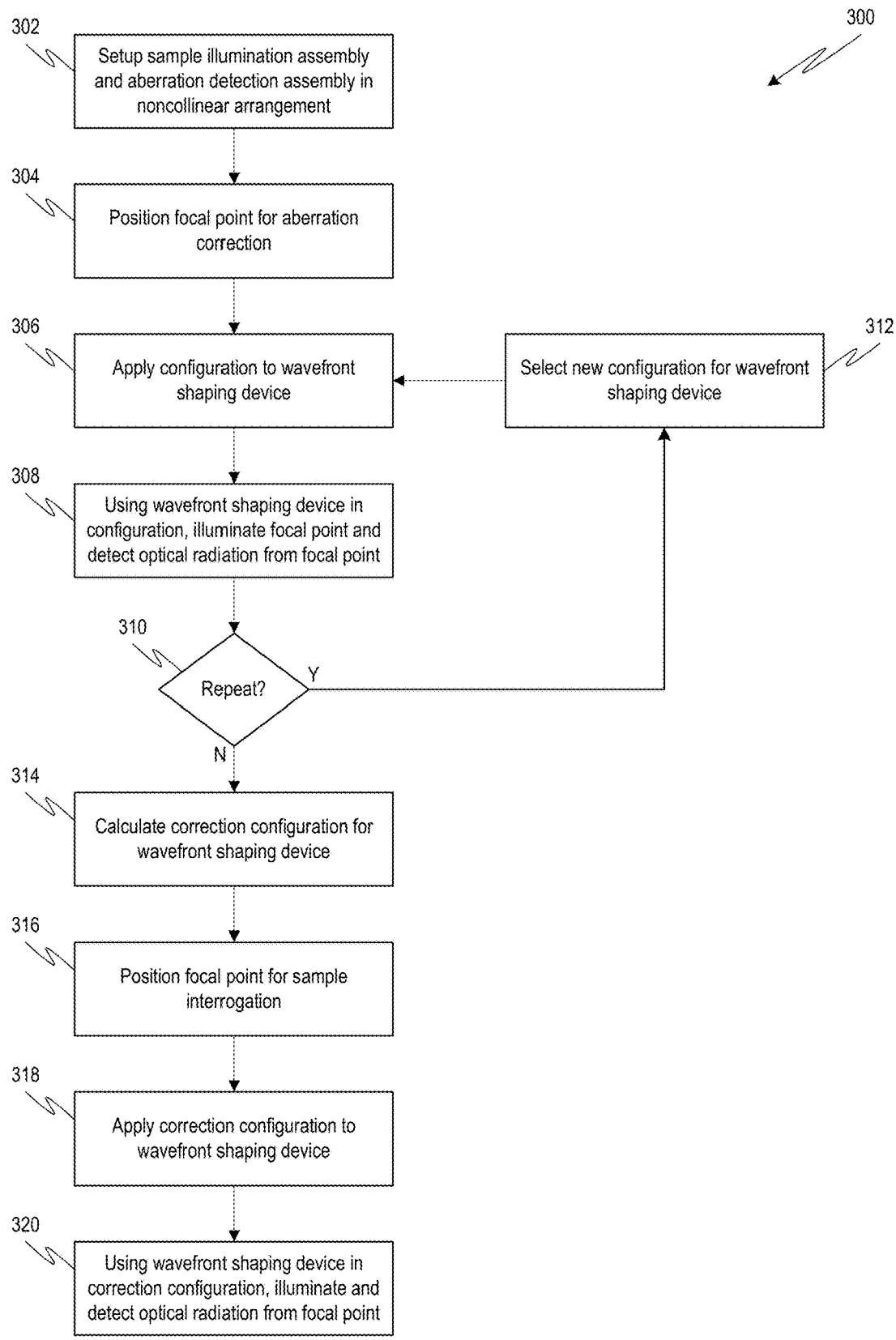
FIG. 3A is a generalized process flow diagram for an exemplary method for aberration correction and sample interrogation, according to one or more embodiments of the disclosed subject matter.

Referring to FIG. 3A, an exemplary process 300 for aberration correction and sample interrogation is illustrated. The process 300 can initiate at 302, where the sample illumination and aberration detection assemblies are setup in a noncollinear arrangement, such that an overlapping region between interrogation and detection beam paths is minimized or at least reduced. As part of the setup 302, a wavefront shaping device can be provided to the sample illumination assembly to modify the interrogating optical radiation en route to the sample or to the aberration detection assembly to modify emitted optical radiation en route to the detector or both. In some embodiments, the aberration detection assembly is separate from another detection assembly for subsequent investigation of the sample, for example, coupled to the sample illumination assembly in an epi-detection configuration.

The process can proceed to 304, where the focal point in the overlapping region of the interrogation and detection beam paths is positioned for configuration of the wavefront shaping device to provide aberration correction. For example, the focal point may be positioned in or on a portion of the sample away from a region of the sample that will be subsequently investigated, such that the illumination necessary for configuring the wavefront shaping device does not damage or otherwise alter the sample. Alternatively, the focal point may be positioned with respect to a control sample positioned adjacent or proximal to a region of the sample that will be subsequently investigated. In yet another alternative, the focal point may be within the region of the sample to be investigated, for example, when the detection for aberration correction is concurrent with the detection for investigation (e.g., using the setup of FIG. 2B).

In any case, it is desirable that the focal point be positioned in an isoplanatic patch with respect to the region of the sample to be investigated. As used herein, "isoplanatic patch" refers to a region over which wavefront errors are closely correlated such that modification of the wavefront by the wavefront shaping device is still effective at correcting the aberrations. In general, the isoplanatic patch depends on the sample and optical system, and thus is experimentally determined or estimated for each setup. For example, for aberration in a single layer transparent sample, a large isoplanatic axial range would be expected (e.g., on the order of mm). In contrast, within scattering biological tissues such as the mouse brain, the isoplanatic correction volume would be substantially narrowed (e.g., 100 µm³).

The process can proceed to 306 where a configuration can be applied to the wavefront shaping device to effect a modified wavefront of the illumination or emitted optical beam at 308. In some embodiments, a correction configuration of the wavefront shaping device is determined using the indirect approach. Thus, a first configuration is applied at 306 and tested at 308. The process can then iterate at 310 to select at 312, apply at 306, and test at 308 a next configuration for the wavefront shaping device. The process 306-312 can be repeated until a certain number of repetitions have been achieved (e.g., a preselected set of configurations), until a change between successive iterations meets a threshold condition, or until any other threshold condition is achieved. The detected optical radiation resulting from the multiple instances of 308 can be used at 314 to determine a correction configuration for the wavefront shaping device that can be used for subsequent sample investigation. When the detection assembly includes a second wavefront shaping device in addition to the first wavefront shaping device of the illumination assembly (e.g., as in FIG. 2C), 306-314 can be separately repeated for the second wavefront shaping device before proceeding to sample investigation.

Figure 3B:
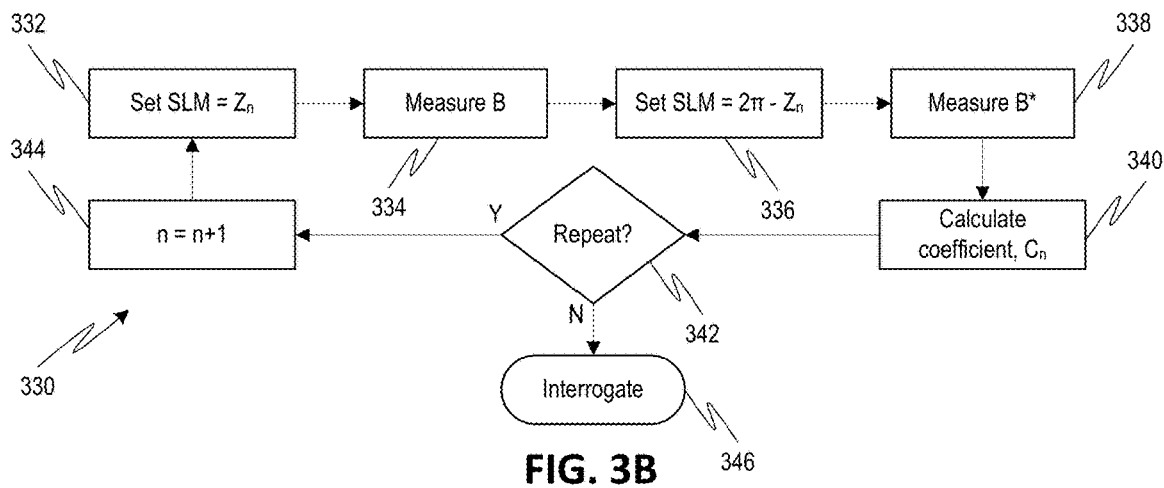
FIG. 3B is a flow diagram for an exemplary iterative sub-process for determining a configuration of a wavefront shaping device, according to one or more embodiments of the disclosed subject matter.

For example, FIG. 3B shows an iterative approach 330 for applying configurations to the wavefront shaping device to determine a final correction configuration (e.g., optimized phase of the wavefront shaping device). Approach 330 may have similarities to that discussed by Booth et al. ("Adaptive Aberration Correction in a Confocal Microscope, *Proceedings of the National Academy of Sciences*, April 2002, 99(9): pp. 5788-92), which is incorporated by reference herein. As a basis for phase aberrations, the set of orthogonal Zernike polynomials (normalized to 2π), which are well suited for circular boundary conditions, can be used. At 332, a first of the Zernike polynomials, $Z_n$, is selected and projected (e.g., activating the SLM to apply phase corresponding to the Zernike polynomial) on the wavefront shaping device (e.g., SLM). At 334, the illumination beam is modified by the wavefront shaping device, and the resulting intensity metric response (e.g., $B=\Sigma I^2(x,y)$) of the spectrum from the sample is measured. At 336, the inverse of the selected Zernike polynomial (e.g., $2\pi-Z_n$) is projected on the wavefront shaping device. At 338, the illumination beam is again modified by the wavefront shaping device, and the resulting intensity metric response (e.g., $B^*=\Sigma I^2(x, y)$) of the spectrum from the sample is measured.

At 340, the coefficient $C_n$ of the selected Zernike polynomial can be determined by the relative weight of the intensity squared difference: $\Delta B=B-B^*$. For example, the coefficient can be given by $$C_n = \frac{B-B^*}{\Sigma|B-B^*|}.$$

At 342, it is determined if the process should be repeated, for example, by selecting the next Zernike polynomial (e.g., n=n+1) and repeating 332-340. Otherwise, the process 330 can proceed to 346 for investigating the sample using the correction configuration for the wavefront shaping device. The repeat determination 342 can be based on a predetermined number of Zernike polynomials to consider, a threshold value for a final coefficient amplitude, or any other criteria (e.g., elapsed time). In some embodiments, 332 can be proceeded by an initial uniform configuration (e.g., uniform phase) projected on the wavefront shaping devices, such that a total number of iterations is 2N+1, where N is the number of selected Zernike polynomials.

For example, the response differences of the first twenty-one Zernike polynomials can be measured, excluding the vertical and horizontal tilt phases (e.g., omitting or weighting less those Zernike polynomials corresponding to the tilt phases) that may merely represent a lateral shift of the focal point. To minimize the influence of random intensity fluctuations on the phase optimization protocol, a threshold can be set on the final coefficient amplitude. For example, after projecting each Zernike polynomial and its inverse on the wavefront shaping device and measuring the resulting signal intensity for both, the difference between these measured signal intensities can be calculated. This calculated difference can be considered the "influence" (i.e., the coefficient before normalization) of each specific Zernike polynomial on the optimization process. Zernike polynomials that had a low "influence" value, for example, less than 10% of the most "influential" Zernike polynomial (i.e., largest calculated difference), can be omitted, for example, to avoid false results that might arise from random fluctuations of the signal.

The final corrected configuration (e.g., phase of the SLM) for the wavefront shaping device be obtained by combining the calculated Zernike coefficients, for example, by performing an average (e.g., a weighted average, which weighting may be determined experimentally) of the calculated Zernike coefficients. For example, each Zernike polynomial was multiplied by its "influence" value and the results were added together to yield a phase map. Values were then normalized to the range of this phase map (e.g., if it should span $2\pi$, $4\pi$, etc.). In some embodiments, phase wrapping could be used so that the wavefront shaping device provides a much greater span of values. For example, if it is desired to span $4\pi$, but an SLM has only $3\pi$, then phase wrapping could be employed such that every value above $3\pi$ could be changed periodically, for example, such that $4\pi$ becomes $1\pi$. Other methodologies for combining the calculated coefficients into a final correction configuration for the wavefront shaping device are also possible.

The above-discussion reflects just one example of an iterative optimization for the configuration of the SLM to provide aberration correction. However, other iterative optimization techniques are also possible. Indeed, any technique for optimizing the configuration of adaptive optics (whether in the beam path of the illumination optical radiation or detected optical radiation) for wavefront shaping to account for aberrations can be readily incorporated into the disclosed systems and methods. For example, any set of orthogonal functions could be used instead of Zernike polynomials, such as Hadamard base or pseudo-Zernike polynomials. Other exemplary techniques include, but are not limited to, wavefront sensorless AO algorithms and data-based online nonlinear extremum-seeker algorithms. Accordingly, embodiments of the disclosed subject matter are not limited to the specific example employing Zernike polynomials.

Returning to FIG. 3A, after, before, or contemporaneous with the correction configuration of the wavefront shaping device is determined at 314, the focal point of the optical system can be moved to a second position for investigation of the sample at 316. As noted above, the focal point at 316 should be within an isoplanatic patch with respect to the focal point at 304, such that the aberration correction determined by 306-314 will apply at the second position. The determined correction configuration is applied to the wavefront shaping device at 318, and the sample is subsequently interrogated at 320, where the interrogating optical radiation and/or the emitted optical radiation has been corrected by the wavefront shaping device for aberrations. As noted above, the emitted optical radiation may be detected by the same detection assembly that performs the aberration correction configuration determination (e.g., 306-314), either in a non-collinear configuration or reconfigured in an epi-detection configuration, or by a separate detection assembly that solely performs the sample investigation detection (e.g., 320), for example, in an epi-detection configuration.

In some embodiments, a correction configuration of the wavefront shaping device is determined using the direct approach (e.g., using a wavefront sensor), in which case process 306-314 may occur only once. Contributions from out-of-focus regions can degrade the performances of the wavefront sensor and thus lead to a false estimation of the aberration in conventional direct approaches. However, by using the wavefront sensor in the disclosed non-collinear configuration, out-of-focus light can be prevented from reaching the wavefront sensor. The performances of the direct and indirect wavefront shaping implementations are expected to be similar, with the exception that indirect approaches can be applied to more scattering samples where the wavefront provided by the "guide-star" may not be viable. In other embodiments employing the direct approach, a separate epi-detection assembly may be provided, such that 306-314 occur contemporaneously with 318-320. In such embodiments, the focal point for aberration correction can be the same as that for sample interrogation, in which case 316 may be effectively omitted. Processes 306-318 may be repeated such that the configuration of the wavefront shaping device is updated in real time as the sample is being interrogated at 320.

Figure 4A:
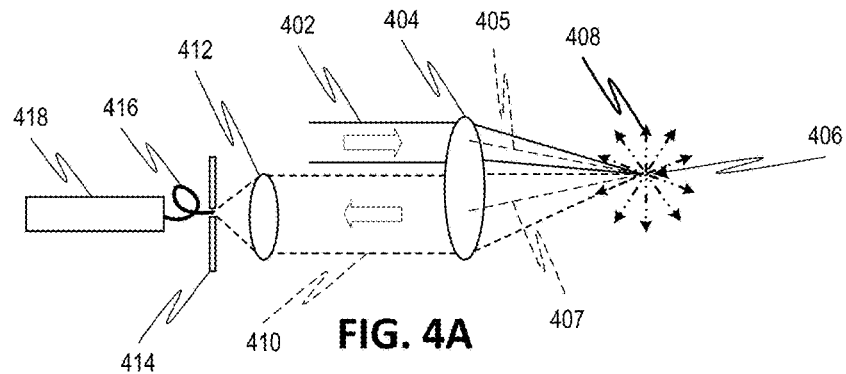
FIGS. 4A-4C are simplified schematic diagrams for explaining ideal, aberrated, and wavefront corrected operations, respectively, of a Brillouin spectroscopy system interrogating a sample, according to one or more embodiments of the disclosed subject matter.
Figure 4B:
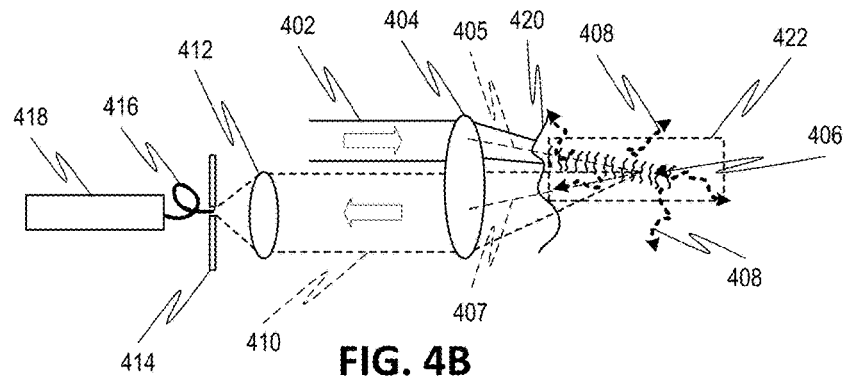
Figure 4C:
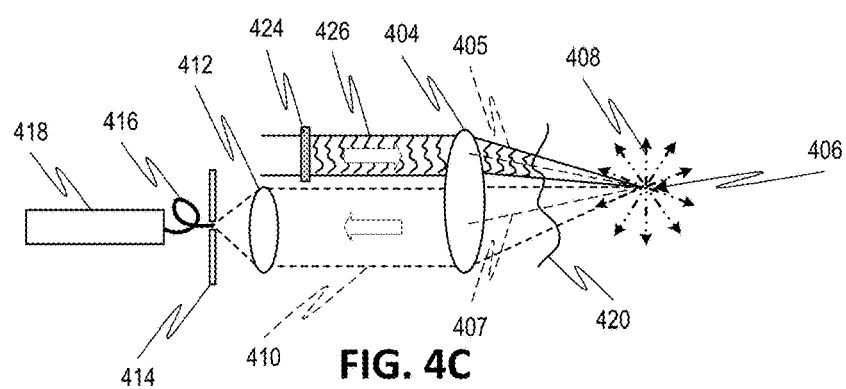

As a representative example of wavefront shaping for aberration correction in a setup with un-localized signals, a confocal Brillouin spectroscopy system was constructed and tested. In the Brillouin spectroscopy system, the enhancement offered by the non-collinear arrangement between illumination and detection arms can be understood by consideration of the simplified confocal configuration of FIGS. 4A-4C. As shown in FIG. 4A, interrogating light 402 incident on an objective lens 404 is focused at focal point 406. Without aberrations, most of the Brillouin photons 408 are generated at the focal point 406, which is conjugated to the confocal pinhole 414 and transmitted to spectrometer 418 via waveguide 416 (e.g., optical fiber), focusing lens 412, and objective lens 404. As with the other embodiments previously described, the optical axis 405 for the interrogating light 404 is at a non-zero angle with respect to the optical axis 407 for the detected light 410 emanating from the focal point 406. However, as shown in FIG. 4B, an aberration 420 within the optical path will disperse the incident light energy over a larger volume 422, thereby generating Brillouin photons 408 at various locations. Since these various locations are not conjugate to the confocal pinhole 414, they are blocked by the pinhole 414 from reaching the spectrometer 418, thereby leading to a degraded signal. By correcting for the aberration 420 using a wavefront shaping device 424 (e.g., SLM), e.g., to produce a modified wavefront interrogating optical beam 426, the focal point 406 can be retrieved, as shown in FIG. 4C. Although FIG. 4C illustrates aberration correction on the illumination side only, it is also possible to provide aberration correction on the detection side alone or in addition to the illumination side, as otherwise noted above.

Figure 5:
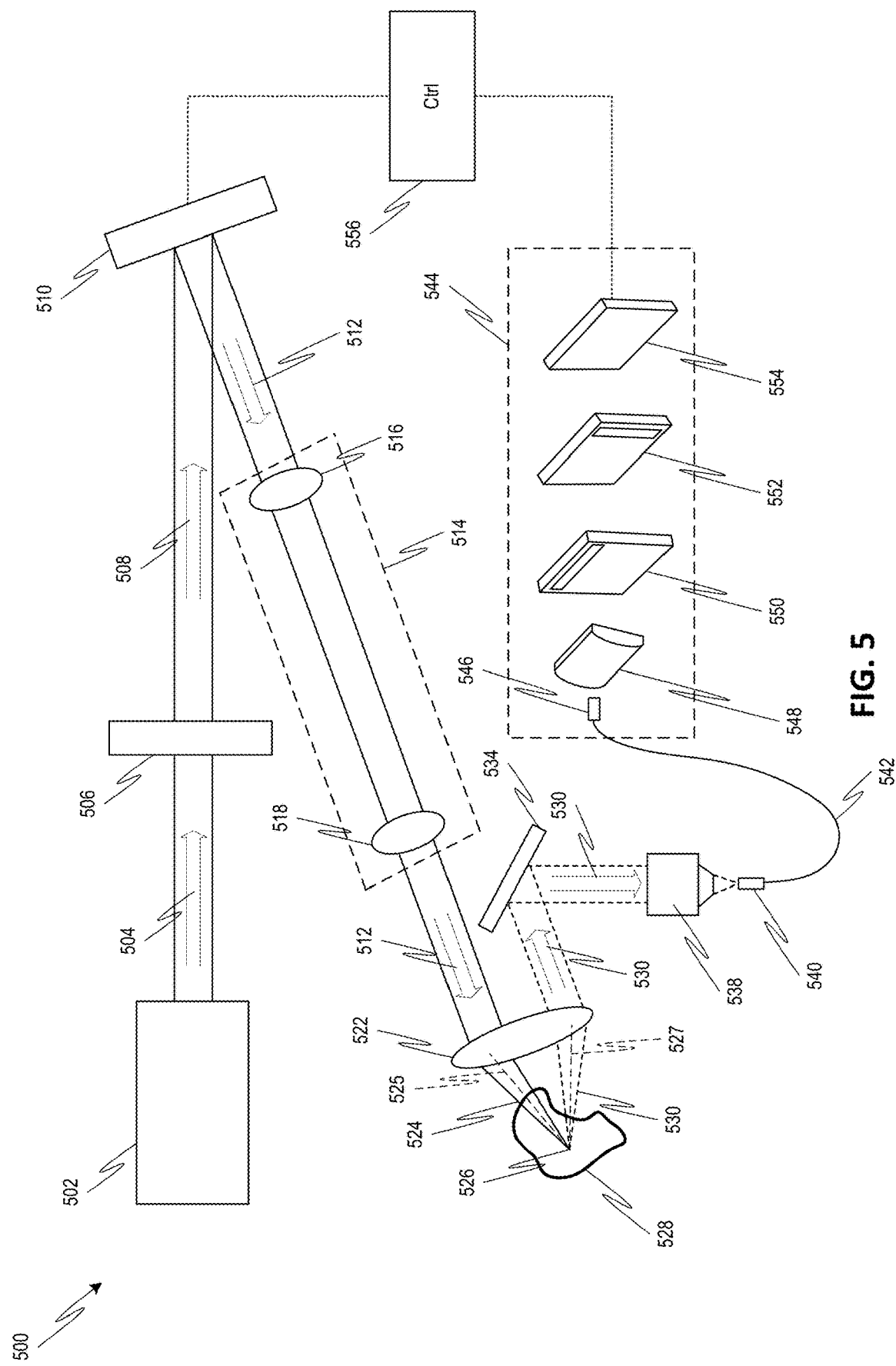
FIG. 5 illustrates an exemplary arrangement of a non-collinear Brillouin spectroscopy system with wavefront shaping for aberration correction, according to one or more embodiments of the disclosed subject matter.

FIG. 5 shows a simplified schematic diagram of a confocal microscope system 500 with Brillouin spectrometer 544, according to embodiments of the disclosed subject matter, that was constructed and tested. Optical radiation source 502 (e.g., laser providing a beam having a single wavelength at 660 nm) provides illumination beam 504 to a linear polarizer 506 to generate linearly polarized beam 508. The linear polarization can ensure a phase-only spatial modulation by spatial light modulator (SLM) 510. The linearly polarized beam 508 is reflected by the operative surface of the SLM 510 to produce wavefront modified beam 512. The operative plane of the SLM 510 is imaged using a 4-f imaging system 514, which is comprised of lens 516, 518 (e.g., focal lengths of 200 mm and 250 mm, respectively), onto the back entrance of objective lens 522 (e.g., focal length of 40 mm). The objective lens 522 focused the wavefront modified interrogation beam 512 onto focal point 526 in or on a sample of interest 528.

The confocal microscope system 500 employs a dual-axis confocal configuration (e.g., where the optical axis 525 for the interrogation beam 512 is at a non-zero angle with respect to the optical axis 527 for the detecting light 530), which has reduced collection efficiency compared to epi-detection. However, such a configuration can eliminate (or at least reduce) noise generated by back reflections and yield higher axial resolution for a given numerical aperture. Scattered light 530 was collected by objective lens 522 and coupled, for example, via optional redirecting mirror 534 and focusing objective 538, into a single mode fiber 542 serving as a confocal pinhole 540. In some embodiments, redirecting mirror 534 can instead be replaced by a second wavefront shaping device (e.g., SLM) for also applying aberration correction on the detection side. Optical radiation can then be conveyed into spectrometer 544 via waveguide aperture 546. The spectrometer can be a double-stage virtually imaged phase array (VIPA) spectrometer, for example, having a cylindrical lens 548, a pair of orthogonally oriented VIPAs 550, 552, and a two-dimensional detector 554. For example, the detector 554 can be a charge-coupled device (CCD) image sensor, a complementary metal-oxide semiconductor (CMOS) image sensor, or any other radiation detecting sensor. Beyond those specifically illustrated in FIG. 5, additional or different optical elements are also possible and will be readily apparent to one of ordinary skill in the art. In the constructed example, the spectrometer had a 15 GHz free-spectral-range, and the detector was an electron multiplying charge coupled device (EMCCD) camera.

A control system 556 can be coupled to the detector 554 and the SLM 510. The control system 556 can use signals from the detector 554 to modify a configuration of the SLM 510. For example, the control system 556 can monitor the Brillouin spectrum intensity as provided by detector 554 and vary the phase introduced by the SLM 510 to enhance the Brillouin signal. As discussed above, the indirect approach can be used to correct the wavefront correction and enhance Brillouin signal, in particular, through an iterative process based on the acquired spectra. This approach is made possible by the rapid acquisition times characteristic of VIPA-based spectrometers which can be as low as 50 ms. Nevertheless, in the presence of aberrations, the indirect wavefront correction results in an overall optimization process of tens of seconds. The indirect approach may thus be better suited to non-absorbing samples where long illumination times are not a concern or to samples where isoplanatic regions are large enough that the iterative process can be performed only once for the entire sample region to be investigated.

Figure 6A:
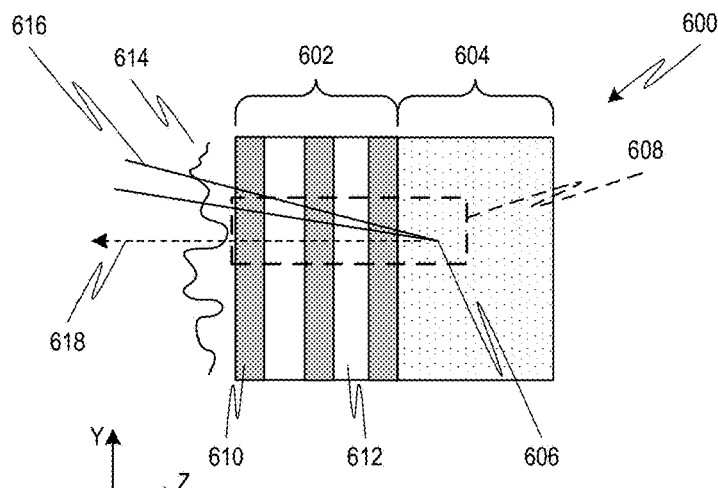
FIG. 6A is a simplified schematic diagram illustrating a testing setup for aberration correction of a phantom sample interrogated by the Brillouin spectroscopy system of FIG. 5.

To characterize the improvement of the constructed wavefront shaped-Brillouin system 500, a phantom sample was prepared, as shown in FIG. 6A. The phantom sample had a sample region 602 formed of alternating layers of a first adhesive tape 610 and a second, different adhesive tape 612 (e.g., each with layer thickness of ~70 μm). Below the sample region 602 was a control region 604 formed by a water-filled chamber. An aberration 614 was provided by spreading a thin layer of glue on the external surface of sample region 602. Interrogating light 616 from system 500 is focused through aberration 614 to a focal point 606 in sample 602 or control 604 regions, thereby resulting in emitted light 618 for detection by spectrometer 544 of system 500.

Figure 6B:
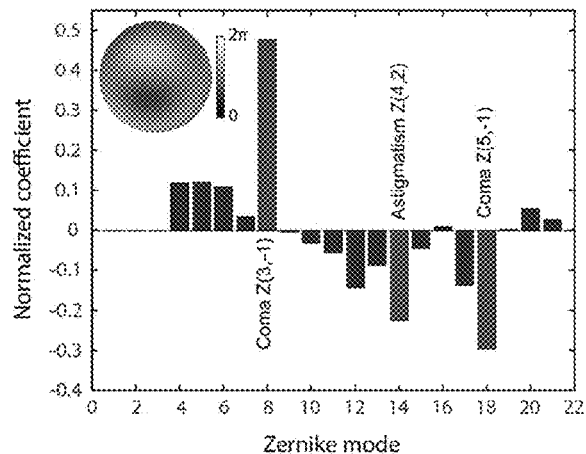
FIG. 6B is a graph of experimentally determined Zernike coefficients for the wavefront shaping device of the Brillouin spectroscopy system of FIG. 5 in interrogating the phantom sample of FIG. 6A.
Figure 6C:
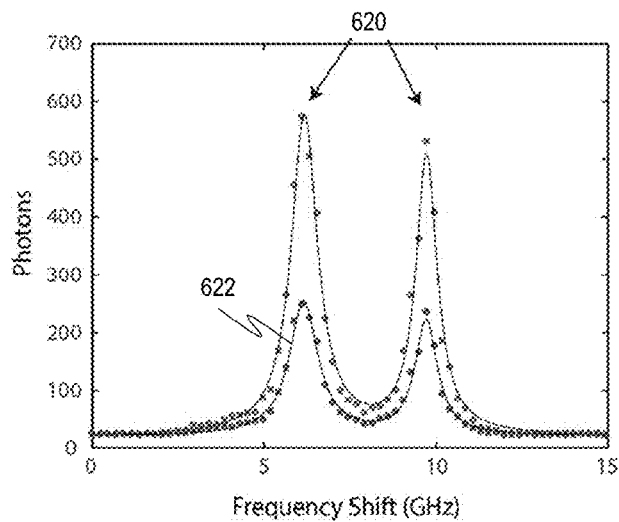
FIG. 6C is a graph of the measured Brillouin spectra for the testing setup of FIG. 6A with and without aberration correction by the wavefront shaping device.

The indirect approach, as described above with respect to FIGS. 3A-3B, was applied with the focal point 606 in the control region 604 to determine optimal Zernike coefficients for SLM 510 in system. The determined Zernike coefficients are shown in the bar graph of FIG. 6B. In this experimental setup, the dominant aberrations were coma and astigmatism, which are typically introduced by refractive index mismatches. As shown in FIG. 6C, the wavefront shaping results in an enhanced intensity for the water signal 620, i.e., a 2.5-fold increase as compared to without aberration correction 622. The iterative aberration correction process was repeated several times to confirm that it was robust and consistently provided the same estimation for the sample aberrations.

Wavefront correction also improves spatial resolution because of a sharper focal point at the measured location. To evaluate the resolution improvement, an axial scan of the layered sample region 602 and control region 604 was performed, and the Brillouin shift measured at each axial location before and after the wavefront correction. The optimal axial resolution of system 500 was characterized to be 47 μm at FWHM, sufficient to observe the layered structure of sample region 602. However, due to the aberration 614, the resolution of the system 500 degrades to approximately 80 μm without wavefront phase correction. As shown by blue data points 640 in FIG. 6D, the layers of the sample 602 cannot be distinguished. Once the appropriate wavefront correction is applied via SLM 510, the layers 610, 612 become clearly resolved, as shown by orange data points 650 in FIG. 6D. The wavefront correction enhanced the resolution of system 500 to 57 µm, thereby approaching ideal or optimal performance.

Figure 6D:
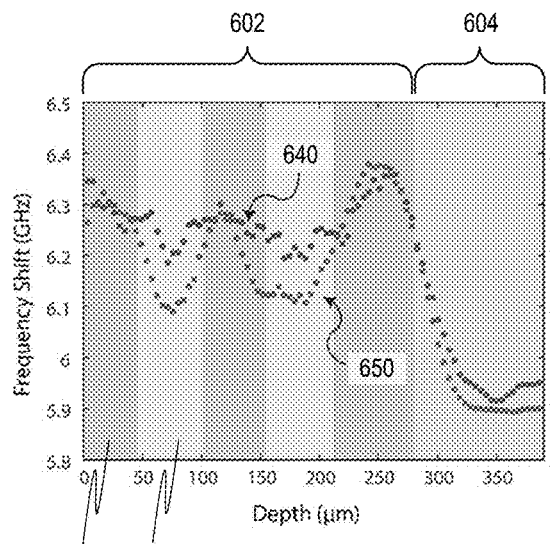
FIG. 6D is a graph of Brillouin frequency shift as a function of depth for the testing setup of FIG. 6A with and without aberration correction by the wavefront shaping device.

In the measurement of FIG. 6D, the optimization routine was performed only once throughout the entire axial scan. The region 608 in which the optimized configuration of the SLM 510 remains effective at correcting the aberration 614 defines the isoplanatic patch, which is sample dependent. In the case of this phantom sample, the axial isoplanatic patch covered the entire sample region 602, and a 50% signal enhancement was observed up to 300 µm away from the initial corrected location. A large isoplanatic axial range is expected in the case of a single layer transparent aberration, while scattering biological tissues are expected to have much smaller ranges.

Figure 7A:
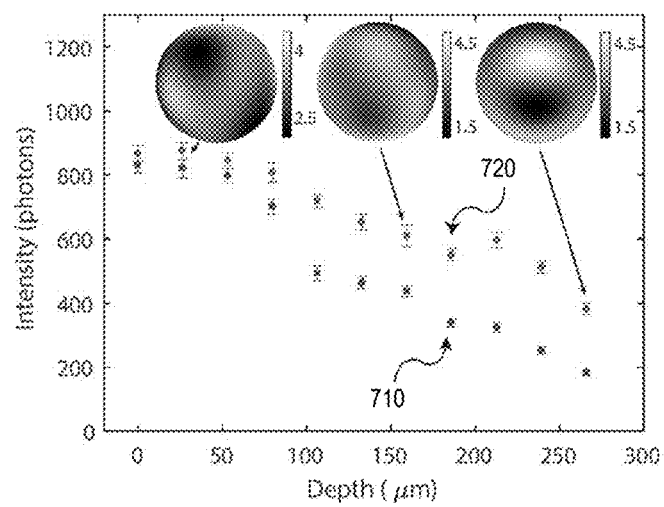
FIG. 7A is a graph of Brillouin signal intensity as a function of depth for interrogation of the cornea and aqueous humor of a fresh porcine eye by the Brillouin spectroscopy system of FIG. 5 with and without aberration correction by the wavefront shaping device.
Figure 7B:
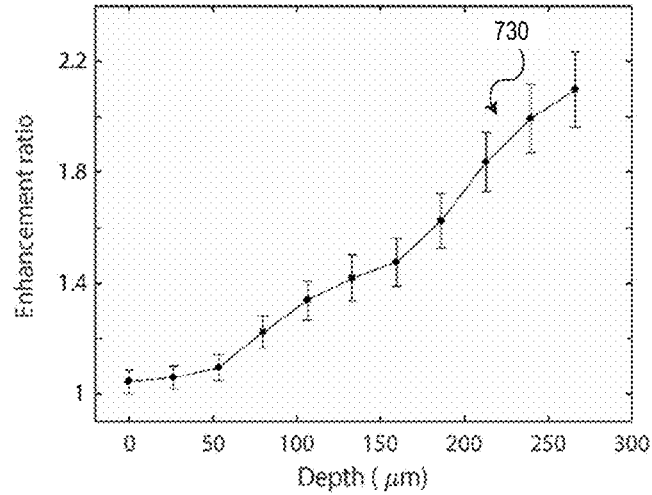
FIG. 7B is a graph of Brillouin signal enhancement (e.g., corrected/uncorrected) as a function of depth for the interrogation of the cornea and aqueous humor of a fresh porcine eye by the Brillouin spectroscopy system of FIG. 5.

To demonstrate the advantage of system 500 in investigating biological samples, an axial measurement was made through the cornea and aqueous humor of a fresh porcine eye. Although the cornea is transparent, the signal intensity drops considerably as a function of depth due to aberrations, as shown by the blue data points 710 of FIG. 7A. By determining and applying wavefront correction using SLM 510 in system 500, Brillouin signal intensity was increased more than 2-fold, as shown by the orange data points 720 in FIG. 7A. As shown by curve 730 in FIG. 7B, the enhancement of signal intensity by the wavefront correction increased at greater depths, as expected given the increased signal degradation due to aberrations introduced by the cornea.

Figure 7C:
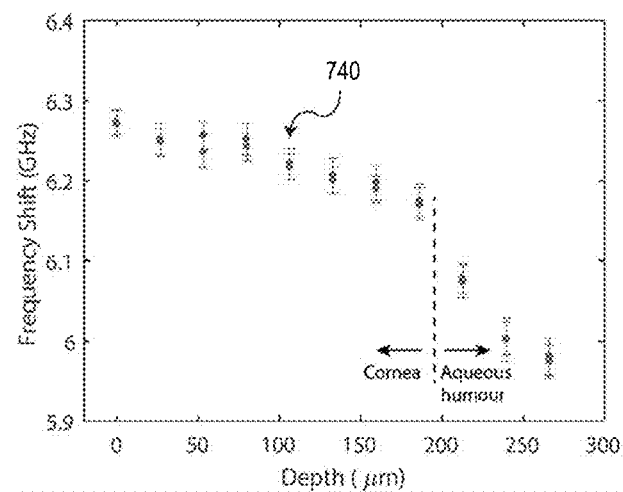
FIG. 7C is a graph of Brillouin frequency shift with and without aberration correction for the interrogation of the cornea and aqueous humor of a fresh porcine eye by the Brillouin spectroscopy system of FIG. 5.

FIG. 7C shows the Brillouin frequency shift for every optimized location with wavefront correction (orange dots) and without wavefront correction (blue dots 440). The difference in the Brillouin shift values falls within the standard deviation of the measurement. This result is relevant for practical purposes since an active element placed within the optical path can change the location of the focal point while converging towards the optimal signal enhancement. Particularly, in Brillouin spectroscopy, the signal is not confined to a point object as in fluorescence microscopy but can originate from any point within the illuminated region (as in a so-called fluorescent sea). As a result, because the active element can easily shift the illumination focal point (e.g., SLM 510 can axially dislocate the focal point by hundreds of microns), when the signal intensity has a spatial gradient (as is the case along the z-axis of the cornea sample), the tendency of the system to shift the measured location along the intensity gradient can be significant. As illustrated by FIG. 7C, the dislocation of the measured point in experiments with system 500 was negligible, and the wavefront phase projection provided similar Brillouin shift values as the uncorrected scenario. This result was further confirmed by repeating the iterative process many times at a single location of the cornea and obtaining a variation in Brillouin shift of less than 10 MHz, i.e., less than the single point shift precision of system 500. Measurement artifacts were avoided due to the confocal gating built within the system 500. In particular, while the determination of the correction configuration for SLM 510 was performed on the illumination arm of the system 500, the collection/detection path was kept fixed. Under these circumstances, a dislocation of the focal point will result in a mismatch between the illuminated point and the confocal pinhole which will decrease the signal intensity.

Figure 8A:
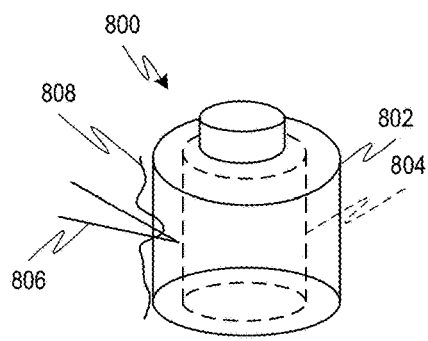
FIG. 8A is a simplified schematic diagram illustrating a setup for aberration correction of another test sample interrogated by the Brillouin spectroscopy system of FIG. 5.
Figure 8C:
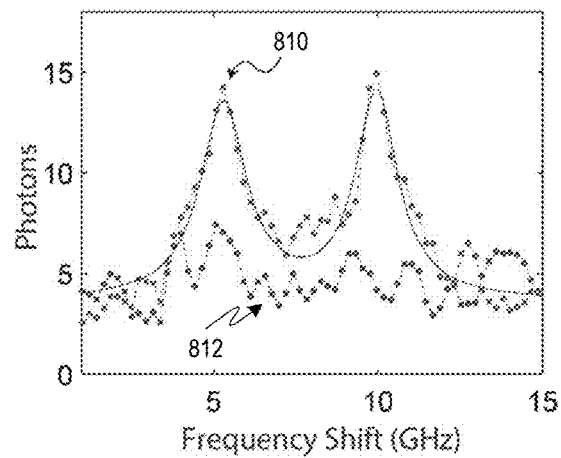
FIG. 8C is a line plot graph of portions of the Brillouin frequency shift data of FIG. 8B.
Figure 8B:
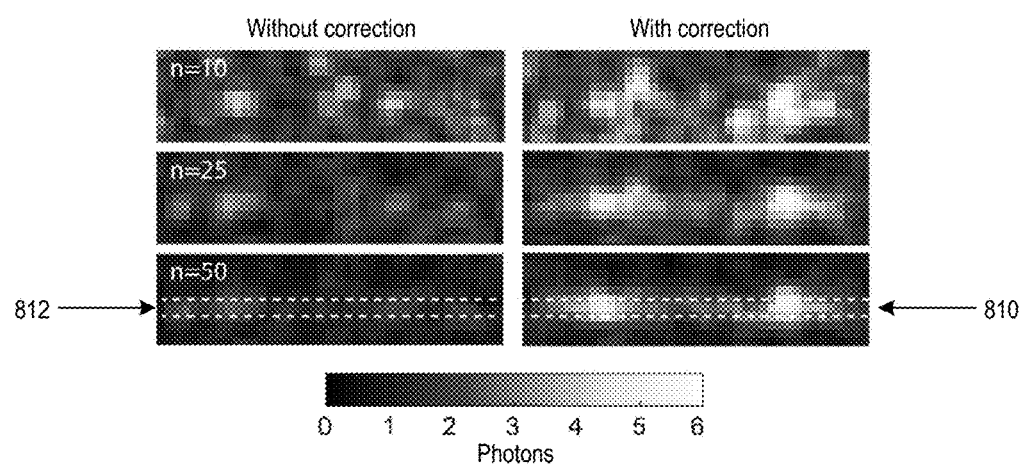
FIG. 8B is a heat map of Brillouin frequency shift data measured in the testing setup of FIG. 8A with and without aberration correction by the wavefront shaping device for various iterations.

Besides nicer looking images/spectra obtained by wavefront shaping, in certain scenarios, wavefront shaping may be necessary to allow a measurement, for example, by overcoming a fundamental barrier. For example, when the signal-to-noise (SNR) of the acquired spectrum is less than one due to aberrations, the signal may not be recovered by increasing the integration time of the measurement or averaging many acquired spectra. Referring to FIG. 8A, a test setup 800 for evaluating such a scenario is illustrated. In particular, a glass bottle 802 had an internal volume 804 filled with methanol as a test sample. An aberration 808 was provided on an external surface of the glass bottle 802 via a layer of glue. Because of the low SNR caused by aberrations and poor Brillouin gain of glass, measuring the Brillouin signal of glass through the aberration 808 was not possible. Repeating and averaging over many acquired spectra did not increase the SNR of the measurement, as illustrated in the left panel of FIG. 8B.

Determination of a wavefront correction configuration for SLM 510 was performed using a focal point for interrogating light 806 in the methanol 804, which has high Brillouin gain, near the interface between the glass and methanol, i.e., within its isoplanatic patch. After obtaining the appropriate SLM configuration for phase correction, the sample was translated to measure the Brillouin signature of glass 802. The resulting spectra obtained by spectrometer 544 has an SNR>1, which could thus be averaged for proper spectral analysis as illustrated in the right panel of FIG. 8B. Under these conditions, wavefront shaping offered a unique solution to enable spectral analysis of the glass that would otherwise not be possible, as illustrated by the difference between Brillouin spectrum 812 without aberration correction and Brillouin spectrum 810 with aberration correction in FIG. 8C.

Although the examples described above employ a non-collinear arrangement to obtain the reduced overlap between the interrogation and detection beam paths, embodiments of the disclosed subject matter are not limited thereto. Rather, other techniques can be used to provide the desired reduced overlap to act as a pseudo guide-star without having the interrogation and detection beam paths at non-zero angles with respect to each other. For example, the interrogation optical beam path can have a first spot size on or in the sample, and the detection optical beam path can be limited to a smaller second spot size on or in the sample. The beam paths may otherwise be collinear (e.g., in an epi-detection configuration).

Although some of the embodiments described above refer to "imaging," the production of an actual image is not strictly necessary. Indeed, the mentions of "imaging" are intended to include the acquisition of data where an image may not be produced. Accordingly, the use of the term "imaging" herein should not be understood as limiting.

Although particular optical components and configuration have been illustrated in the figures and discussed in detail herein, embodiments of the disclosed subject matter are not limited thereto. Indeed, one of ordinary skill in the art will readily appreciate that different optical components or configurations can be selected and/or optical components added to provide the same effect. In practical implementations, embodiments may include additional optical components or other variations beyond those illustrated, for example, additional reflecting elements to manipulate the beam path to fit a particular microscope geometry. Accordingly, embodiments of the disclosed subject matter are not limited to the particular optical configurations specifically illustrated and described herein.

It will be appreciated that the aspects of the disclosed subject matter, for example, the control system 216, control system 556, process 300, and/or process 330, can be implemented, fully or partially, in hardware, hardware programmed by software, software instruction stored on a computer readable medium (e.g., a non-transitory computer readable medium), or any combination of the above. For example, components of the disclosed subject matter, including components such as a control unit, controller, processor, user interface, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates the transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine-readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

It is thus apparent that there is provided, in accordance with the present disclosure, methods and arrangements to enhance optical signals within aberrated or scattering samples. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:
1. An optical system comprising:
an illumination optical assembly configured to focus interrogating optical radiation to a focal point on or in a sample, the focused interrogating optical radiation propagating to the focal point along a first optical axis;
a first detection optical assembly configured to direct optical radiation emanating from the focal point to a first detector, the emanating optical radiation propagating from the focal point along a second optical axis;
a second detection optical assembly configured to direct optical radiation emanating from the focal point to a second detector, the second detection optical assembly being coupled to the illumination optical system in an epi-detection configuration;
a wavefront shaping device comprising an electro-optic device or phase-changing element disposed in an optical path of the interrogating optical radiation or in an optical path of the emanating optical radiation; and
a controller comprising a processor and computer-readable storage medium storing computer-readable instructions that, when executed by the processor, cause the processor to set a configuration of the wavefront shaping device to correct for aberration,
wherein the first optical axis is at a non-zero angle with respect to the second optical axis.

2. The optical system of claim 1, wherein the angle between the first and second optical axes is at least 15°.

3. The optical system of claim 1, wherein the computer-readable storage medium stores computer-readable instructions that, when executed by the processor, cause the processor to set the configuration of the wavefront shaping device without provision of a separate guide-star or beacon.

4. The optical system of claim 1, wherein the computer-readable storage medium stores computer-readable instructions that, when executed by the processor, cause the processor to:
iteratively set the wavefront shaping device with different configurations based on projections of Zernike polynomials;
for each wavefront shaping device configuration, receive corresponding signals from the first detector indicative of optical radiation emanating from the focal point after illumination by the interrogating optical radiation; and
determine an aberration correction configuration for the wavefront shaping device based on the received signals.

5. The optical system of claim 1, wherein the illumination optical assembly and the first detection optical assembly share an objective lens proximal to the sample.

6. The optical system of claim 1, wherein the wavefront shaping device is disposed in the optical path of the interrogating optical radiation, and the first detection optical assembly is configured as a fixed confocal detection arm.

7. The optical system of claim 1, wherein the first detection optical assembly or the second detection optical assembly are configured as a spectrometer for detection of scattered light from the sample.

8. The optical system of claim 7, wherein the scattered light is one of Brillouin scattered light, Raman scattered light, Mie scattered light, or Rayleigh scattered light.

9. The optical system of claim 1, wherein the first detection optical assembly or the second detection optical assembly includes a filter that has a passband for fluorescent light emitted by the sample.

10. The optical system of claim 1, further comprising:
a stage that supports the sample thereon, wherein the computer-readable storage medium stores computer-readable instructions that, when executed by the processor, cause the processor to control the stage to position the focal point at a first location on or in the sample for aberration correction, and to position the focal point at a second location on or in the sample for subsequent interrogation; or
one or more reflective elements configured to direct the interrogating optical radiation to the focal point or to direct the emanating optical radiation from the focal point, wherein the computer-readable storage medium stores additional computer-readable instructions that, when executed by the processor, cause the processor to control the one or more reflective elements to move the focal point between a first location on or in the sample for aberration correction and a second location on or in the sample for subsequent interrogation.

11. The optical system of claim 1, wherein the wavefront shaping device comprises a spatial light modulator.

12. A method comprising:
(a) using an illumination optical assembly, directing interrogating optical radiation along a first optical axis to a first focal point;
(b) using a first detection optical assembly, directing optical radiation emanating from the first focal point along a second optical axis to a first detector; and
(c) based on one or more signals from the first detector indicative of radiation incident thereon, setting a configuration of a wavefront shaping device to correct for aberration or scattering effects, the wavefront shaping device comprising an electro-optic device or phase-changing element provided in an optical path of the interrogating optical radiation or in an optical path of the emanating optical radiation; and
with the wavefront shaping device set to the configuration to correct for aberration or scattering effects:
arranging the illumination optical assembly and a second detection optical assembly with respect to a second focal point different from the first focal point, the second detection optical assembly being coupled to the illumination optical assembly in an epi-detection configuration; and
using the illumination and second detection optical assemblies, performing at least one of Brillouin light scattering spectrometry, Raman light scattering spectrometry, Rayleigh light scattering spectrometry, Mie scattering spectroscopy, label-free imaging, or densely-labelled fluorescence imaging,
wherein the first optical axis is at a non-zero angle with respect to the second optical axis.

13. The method of claim 12, wherein the second focal point is within an isoplanatic patch with respect to the first focal point.

14. The method of claim 12, wherein (a)-(c) are performed without provision of a separate guide-star or beacon.

15. The method of claim 12, wherein the angle between the first and second optical axes is at least 15°.

16. The method of claim 12, wherein:
(a)-(b) are repeated with the wavefront shaping device in different configurations based on projections of Zernike polynomials; and
(c) comprises determining respective coefficients for the Zernike polynomials based on the optical radiation detected by the first detector during the corresponding repetition of (b).

17. A method comprising:
(a) using an illumination optical assembly, directing interrogating optical radiation along a first optical axis to a first focal point;
(b) using a first detection optical assembly, directing optical radiation emanating from the first focal point along a second optical axis to a first detector; and
(c) based on one or more signals from the first detector indicative of radiation incident thereon, setting a configuration of a wavefront shaping device to correct for aberration or scattering effects, the wavefront shaping device comprising an electro-optic device or phase-changing element provided in an optical path of the interrogating optical radiation or in an optical path of the emanating optical radiation; and
with the wavefront shaping device set to the configuration to correct for aberration or scattering effects:
arranging the illumination optical assembly and the first detection optical assembly with respect to a second focal point different from the first focal point; and
using the illumination and first detection optical assemblies, performing at least one of Brillouin light scattering spectroscopy, Raman light scattering spectroscopy, Rayleigh light scattering spectroscopy, Mie scattering spectroscopy, label-free imaging, or densely-labelled fluorescence imaging,
wherein the first optical axis is at a non-zero angle with respect to the second optical axis.

18. The method of claim 17, wherein the second focal point is within an isoplanatic patch with respect to the first focal point.

\* \* \* \* \*